US008343265B2

(12) United States Patent
Yamamoto et al.

(10) Patent No.: US 8,343,265 B2
(45) Date of Patent: Jan. 1, 2013

(54) AIR CLEANER APPARATUS

(75) Inventors: Sho Yamamoto, Saitama (JP); Shigeru Kodaira, Saitama (JP); Tatsuya Shiokawa, Saitama (JP); Masaki Yamazaki, Saitama (JP); Hiromitsu Shiina, Saitama (JP); Shun Fujitsu, Saitama (JP); Yukinori Kurakawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 197 days.

(21) Appl. No.: 12/883,998

(22) Filed: Sep. 16, 2010

(65) Prior Publication Data

US 2011/0067367 A1 Mar. 24, 2011

(30) Foreign Application Priority Data

Sep. 18, 2009 (JP) ................................. 2009-217318
Jan. 14, 2010 (JP) ................................. 2010-005806

(51) Int. Cl.
*B01D 46/00* (2006.01)

(52) U.S. Cl. ...... 96/420; 55/DIG. 34; 55/418; 55/385.3; 123/198 E

(58) Field of Classification Search ................. 55/385.3, 55/DIG. 34; 123/198 E; 95/8, 14, 23, 278; 96/413, 420, 417, 418, 419; 116/DIG. 25, 116/70, 112, 276, 137 R, DIG. 42; 210/90, 210/138
See application file for complete search history.

(56) References Cited

U.S. PATENT DOCUMENTS

| | | | | |
|---|---|---|---|---|
| 6,228,155 | B1 * | 5/2001 | Tai | 96/413 |
| 6,989,048 | B2 * | 1/2006 | Bardon et al. | 95/278 |
| 7,621,978 | B2 * | 11/2009 | Johansson | 95/26 |
| 7,635,402 | B2 * | 12/2009 | Hoffman | 55/385.3 |
| 7,749,303 | B2 * | 7/2010 | Wright | 95/8 |
| 8,128,729 | B2 * | 3/2012 | Guenther et al. | 95/23 |
| 8,157,890 | B2 * | 4/2012 | Brioschi | 95/14 |
| 2004/0261377 | A1 * | 12/2004 | Sung | 55/385.3 |
| 2007/0180800 | A1 * | 8/2007 | Bajza et al. | 55/385.3 |
| 2008/0245235 | A1 * | 10/2008 | Brioschi | 96/420 |

FOREIGN PATENT DOCUMENTS

JP 57-018451 1/1982

* cited by examiner

*Primary Examiner* — Duane Smith
*Assistant Examiner* — Minh-Chau Pham
(74) *Attorney, Agent, or Firm* — Birch, Stewart, Kolasch & Birch, LLP

(57) ABSTRACT

An air cleaner apparatus includes a lid that covers an opening formed in an air cleaner box is provided with an intake port communicating with the opening. In addition, a regulator is attached to an upper wall portion of the air cleaner box, the intake port is extended to the upper wall portion of the air cleaner box so as to cover the regulator, and the regulator is placed facing inside an intake passage connecting between the intake port and the opening. The air cleaner apparatus so configured provides a sufficient cooling effect, and is excellent in ease of maintenance.

20 Claims, 6 Drawing Sheets

AIR CLEANER APPARATUS

CROSS-REFERENCE TO RELATED APPLICATION

The present application claims priority under 35 U.S.C. §119 to Japanese Patent Application No. 2010-005806, filed Jan. 14, 2010, and to Japanese Patent Application No. 2009-217318, filed Sep. 18, 2009, the entire contents of which are hereby incorporated by reference.

BACKGROUND OF THE INVENTION

1. Field of the Invention

The present invention relates to an air cleaner apparatus with electrical equipment placed inside the air cleaner apparatus.

2. Description of Background Art

In the related art, placing electrical equipment (a heat-generating component such as a regulator) inside the air cleaner box of an air cleaner apparatus is known (see, for example, JP-A No. S57-18451).

Incidentally, in the above-mentioned air cleaner apparatus according to the related art, electrical equipment is placed inside the air cleaner box. However, since the electrical equipment is placed at a position far from an intake port and an inlet port (an intake port 19 and an inlet port 20 shown in FIG. 1 in JP-A No. S57-18451), active forced-air cooling is not provided, making it impossible to bring out the maximum cooling effect. In addition, since the electrical equipment is attached to a maintenance lid of the air cleaner box, the electrical equipment and harnesses connected to the electrical equipment are also moved together with the lid when performing maintenance on the air cleaner, which disadvantageously makes the maintenance cumbersome.

The present invention has been made in view of the above circumstances, and accordingly its object is to provide an air cleaner apparatus which makes it possible to obtain a sufficient cooling effect, and is excellent in ease of maintenance.

SUMMARY AND OBJECTS OF THE INVENTION

As a solution to the above-mentioned problems, in an embodiment of the present invention, there is provided an air cleaner apparatus (40) including an air cleaner box (41) including an opening (43), an element (46B) on which maintenance can be performed through the opening (43) and which is placed in the air cleaner box (41), and a lid member (42) that covers the opening (43), in which the lid member (42) is provided with an intake port (53) communicating with the opening (43), electrical equipment (49) is attached to an outer wall surface (47A) of the air cleaner box (41), the intake port (53) is extended to the outer wall surface (47A) of the air cleaner box (41) so as to cover the electrical equipment (49), and the electrical equipment (49) is placed facing inside an intake passage (W) connecting between the intake port (53) and the opening (43).

In an embodiment of the present invention, the electrical equipment (49) includes a substrate portion (50) accommodating a substrate and a radiator fin (51) disposed upright on its upper surface, a recess (48) is provided in the outer wall surface (47A) of the air cleaner box (41), the substrate portion (50) of the electrical equipment (49) is placed in the recess (48), and the radiator fin (51) is exposed from the recess (48).

In an embodiment of the present invention, a guide portion (90) for guiding an intake air flow admitted from the intake port (53) to the radiator fin (51) is formed in the outer wall surface (47A) of the air cleaner box (41).

In an embodiment of the present invention, the electrical equipment (49) is so placed as to make the radiator fin (51) parallel to a direction of flow velocity of the intake air flow admitted from the intake port (53).

In an embodiment of the present invention, an intake temperature sensor (45) is attached on a downstream side of the electrical equipment (49), and an injection quantity of a fuel injector can be corrected in accordance with an output of the intake temperature sensor (45).

In an embodiment of the present invention, the intake temperature sensor (45) is placed on an upstream side of the element (46B) and in an inner wall surface (44) of the air cleaner box (41).

In an embodiment of the present invention, there is provided an air cleaner apparatus (60) including an air cleaner box (61) including an opening (65), an element (46B) on which maintenance can be performed through the opening (65) and which is placed in the air cleaner box (61), and a lid member (62) that covers the opening (65), in which the lid member (62) is divided into at least a first lid portion (62) and a second lid portion (63), the first lid portion (62) is provided with an intake port (79) communicating with the opening (65), and electrical equipment (49) is attached to an upper surface of the second lid portion (63), and the intake port (79) is extended to the second lid portion (63) so as to cover the electrical equipment (49), and the electrical equipment (49) is placed facing inside an intake passage (W') connecting between the intake port (79) and the opening (65).

In an embodiment of the present invention, the electrical equipment (49) includes a substrate portion (50) accommodating a substrate and a radiator fin (51) disposed upright on its upper surface, a recess (75) is provided in the upper surface of the second lid portion (63), the substrate portion (50) of the electrical equipment (49) is placed in the recess (75), and the radiator fin (51) is exposed from the recess (75).

In an embodiment of the present invention, a guide portion (90) for guiding an intake air flow admitted from the intake port (79) to the radiator fin (51) is formed in the upper surface of the second lid portion (63).

In an embodiment of the present invention, the electrical equipment (49) is so placed as to make the radiator fin (51) parallel to a direction of flow velocity of the intake air flow admitted from the intake port (79).

In an embodiment of the present invention, an intake temperature sensor (45) is attached on a downstream side of the electrical equipment (49), and an injection quantity of a fuel injector can be corrected in accordance with an output of the intake temperature sensor (45).

In an embodiment of the present invention, the intake temperature sensor (45) is placed on an upstream side of the element (46B) and in an inner wall surface (69) of the air cleaner box (61).

In an embodiment of the present invention, the air cleaner box (61) is integrally provided with a battery-accommodating portion (68) having an opening (67) and accommodating a battery (70), and the opening (67) of the battery-accommodating portion (68) is covered by the second lid portion (63).

In an embodiment of the present invention, there is provided an air cleaner apparatus (100) including an air cleaner box (41) including an opening (43), an element (46B) on which maintenance can be performed through the opening (43) and which is placed in the air cleaner box (41), and a lid member (101) that covers the opening (43), in which electrical equipment (49) is attached to an outer wall surface (47A) of the air cleaner box (41), and an intake port (102) communicating with an interior of the air cleaner box (41) is formed near the electrical equipment (49) and so as to be directed toward the electrical equipment (49).

In an embodiment of the present invention, the electrical equipment (49) is attached to a wall surface (114) of the air cleaner box (111) located on a front side of a vehicle body.

Advantageous effects of invention include the following:

Since the electrical equipment is placed inside the intake port, active forced-air cooling is provided to enable an improvement in the efficiency of cooling of the electrical equipment. In addition, since an intake air flow (cooling air flow) can be supplied to the electrical equipment in a stable manner both when the vehicle is running and when it is at a stop, a rise in the temperature of the electrical equipment can be effectively suppressed. Furthermore, when performing maintenance such as replacing or the like of the element of the air cleaner, the lid member is removed to make access to the interior of the air cleaner box. At this time, the electrical equipment is attached not to the lid member but to the air cleaner box side. Further, the electrical equipment is attached not to the first lid portion but to the second lid portion. Thus, the electrical equipment does not become obtrusive when performing maintenance, in particular, when removing the lid member to replace the element. Therefore, the ease of maintenance of the air cleaner can be improved while enabling active cooling of the electrical equipment.

According to an embodiment of the present invention, intake resistance can be reduced by exposing only the radiator fin onto the intake passage. Therefore, intake resistance can be reduced while enhancing cooling efficiency by providing a stable supply of an intake air flow (cooling air flow) to the radiator fin.

According to an embodiment of the present invention, an intake air flow can be gathered to the radiator fin to enable a further improvement in cooling efficiency. Furthermore, since the intake air flow is guided not to the substrate portion but to the radiator fin by the guide portion, intake resistance can be reduced.

According to an embodiment of the present invention, the radiator fin of the electrical equipment is placed parallel to the direction of flow velocity of an intake air flow. Therefore, intake resistance can be reduced while enhancing the efficiency of cooling of the electrical equipment.

According to an embodiment of the present invention, even when the intake temperature rises due to placement of the heat-generating electrical equipment inside the intake port of the air cleaner box, temperature sensing that takes such a temperature rise into consideration can be performed on the downstream side. Therefore, it is possible to perform optimum fuel injection, and efficiently bring out an engine output.

According to an embodiment of the present invention, the intake temperature sensor is placed in the inner wall surface of the air cleaner box. Thus, when removing the lid member to perform maintenance such as replacing or the like of the element of the air cleaner, since the intake temperature sensor is attached not to the lid member but to the air cleaner box side, and the intake temperature sensor is attached not to the first lid portion but to the air cleaner box side, the intake temperature sensor does not become obtrusive when performing maintenance, in particular, when removing the lid member to replace the element. In addition, since the intake temperature sensor is supported on the air cleaner box, attachment of the intake temperature sensor is facilitated. Therefore, the ease of assembly and the ease of maintenance can be improved.

According to an embodiment of the present invention, the electrical equipment and the battery can be placed in close proximity to each other, thereby minimizing the harness length.

According to an embodiment of the present invention, the electrical equipment is placed on the outer wall surface of the air cleaner box near the intake port. Thus, in addition to cooling provided by making the running air flow directly impinge on the electrical equipment, active forced-air cooling is provided by the intake air flow entering the intake port, thereby making it possible to improve the efficiency of cooling of the electrical equipment. Furthermore, when performing maintenance such as replacing or the like of the element of the air cleaner, the lid member is removed to make access to the interior of the air cleaner. At this time, since the electrical equipment is attached not to the lid member but to the air cleaner box side, the electrical equipment does not become obtrusive when performing maintenance. Therefore, the ease of maintenance of the air cleaner can be improved while enabling active cooling of the electrical equipment.

According to an embodiment of the present invention, since the electrical equipment is placed in a portion on which the running air flow readily impinges on, cooling efficiency is improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinbelow, embodiments of the present invention will be described on the basis of the drawings.

Figure 1:
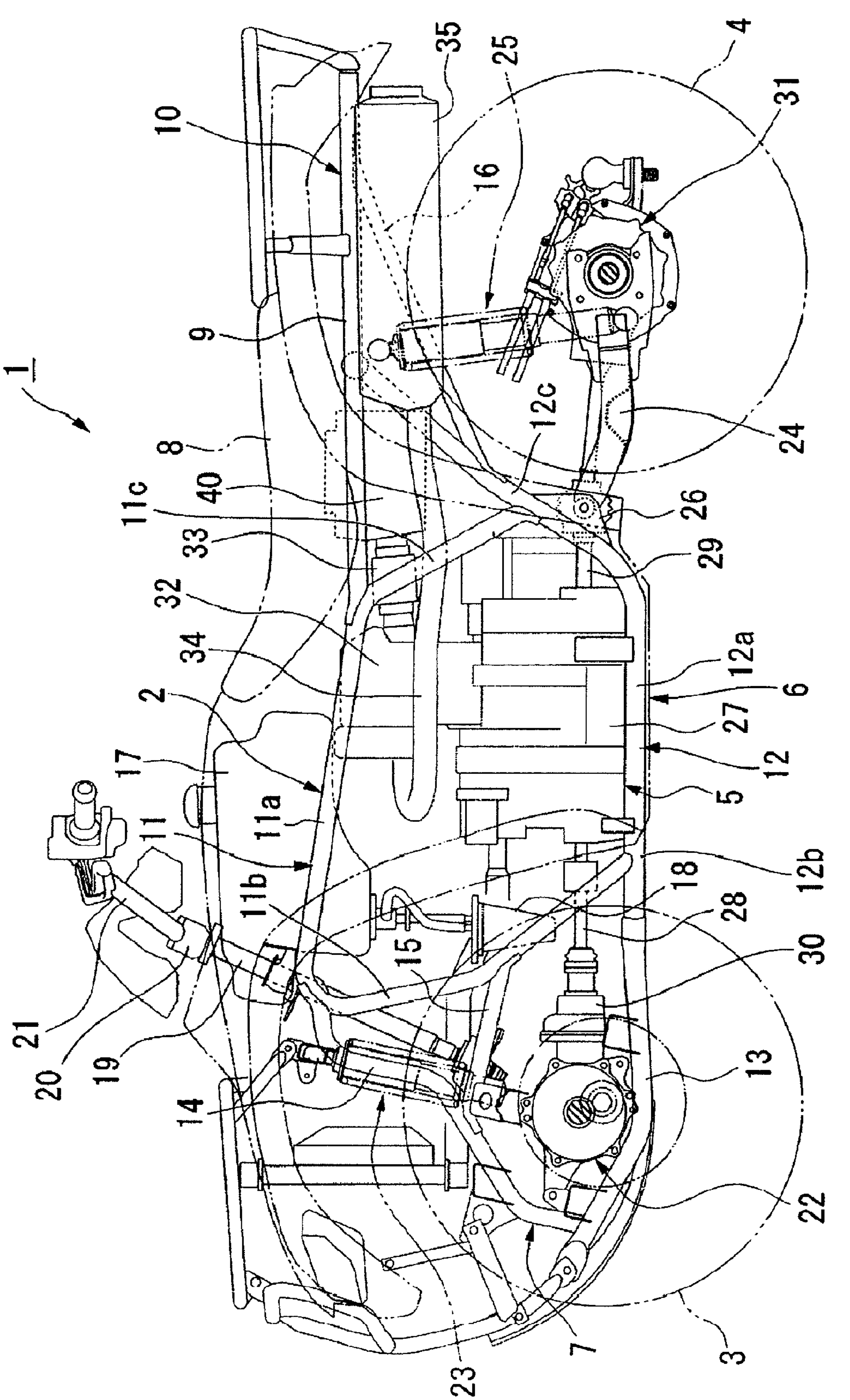
FIG. 1 is a side view of a saddle-ride type four-wheeled vehicle according to an embodiment of the present invention.

FIG. 1 shows a saddle-ride type four-wheeled vehicle 1 as an example of a vehicle mounted with an air cleaner apparatus according to a first embodiment of the present invention. Now, the saddle-ride type four-wheeled vehicle 1 will be described first. It should be noted that in the drawings used in the following description, the arrow FR and the arrow UP indicate the front side of the vehicle and the upper side of the vehicle, respectively, which will be properly used in the following description. Also, the saddle-ride type four-wheeled vehicle 1 is an example of a vehicle on which the air cleaner apparatus according to the present invention can be mounted, and the air cleaner apparatus can be also mounted on another type of vehicle such as a motorcycle, for example.

The saddle-ride type four-wheeled vehicle 1 is a so-called ATV (All Terrain Vehicle), in which left and right front wheels 3 and rear wheels 4 that are low pressure balloon tires of a relatively large diameter are disposed at the front and rear of a body frame 2 forming the vehicle's framework, and an engine unit 5 is mounted on the body frame 2 between the front wheels 3 and the rear wheels 4.

The body frame 2 is formed by binding plural kinds of steel by welding or the like, and mainly includes a center frame portion 6 on which the engine unit 5 is mounted, a front frame portion 7 linked to the front portion of the center frame portion 6 so as to suspend the front wheels 3, and a rear frame portion 10 having seat rails 9 that support a riding seat 8 and linked to the rear portion of the center frame portion 6.

The center frame portion 6 includes a pair of left and right upper pipes 11, 11 and a pair of left and right lower pipes 12, 12. The upper pipes 11, 11 and the lower pipes 12, 12 are both formed by bending a single steel pipe. The upper pipes 11, 11 each integrally have an upper inclined portion 11*a* that is inclined downwards to the rear above the engine unit 5, a front inclined portion 11*b* that extends downwards to the rear from the front end of the upper inclined portion 11*a* so as to form an acute angle with the upper inclined portion 11*a*, and a rear inclined portion 11*c* that extends downwards to the rear from the rear end of the upper inclined portion 11*a* so as to form an obtuse angle with the upper inclined portion 11*a*. On the other hand, the lower pipes 12, 12 each integrally have a lower horizontal portion 12*a* that extends substantially horizontally in the front-rear direction, a coupling portion 12*b* that extends to the inner side from the front end of the lower horizontal portion 12*a* so as to curve in a forwardly projecting manner, and a rear inclined portion 12*c* that extends upwards to the rear from the rear end of the lower horizontal portion 12*a* so as to form an acute angle with the lower horizontal portion 12*a*. The coupling portions 12*b* of the pair of left and right lower pipes 12, 12 are coupled to each other. The lower end of the front inclined portion 11*b* in the upper pipes 11, 11 is joined to the front end of the lower horizontal portion 12*a* in the lower pipes 12, 12, and the lower end of the rear inclined portion 11*c* in the upper pipes 11, 11 is joined to the intermediate portion of the rear inclined portion 12*c* in the lower pipes 12, 12. The upper pipes 11, 11 and the lower pipes 12, 12 are integrated to form the center frame portion 6.

It should be noted that the left and right upper pipes 11, 11 have an unillustrated cross member disposed therebetween at a suitable location and, likewise, the left and right lower pipes 12, 12 also have an unillustrated cross member disposed therebetween at a suitable location. These are bound to each other and integrated.

The front frame portion 7 includes a pair of left and right front lower pipes 13, 13 whose front half portion is inclined upwards to the front and whose rear half portion extends substantially horizontally so that their rear end portion is joined to the coupling portion 12*b* in both the lower pipes 12, 12, a pair of left and right front cushion pipes 14, 14 that couple between the linking portion of the upper inclined portion 11*a* and the front inclined portion 11*b* in the upper pipes 11, 11 and the front end portion of the front lower pipes 13, and a pair of left and right front sub-pipes 15, 15 that are coupled to the intermediate portion of the front cushion pipes 14, 14 and the substantially central region in the vertical direction of the front inclined portion 11*b* in the upper pipes 11, 11.

The front cushion pipes 14, 14 are formed in a cranked fashion so that their lower half portion is located more frontwards than their upper half portion. Also, the left and right front lower pipes 13, 13 have an unillustrated cross member disposed therebetween at a suitable location and, likewise, the front sub-pipes 15, 15 also have an unillustrated cross member disposed therebetween at a suitable location. These are bound to each other and integrated.

The rear frame portion 10 includes a pair of left and right seat rails 9, 9 that extend substantially horizontally to the rear while having its front end joined to the linking portion of the upper inclined portion 11*a* and the rear inclined portion 11*c* in the upper pipes 11, 11, a pair of left and right rear sub-pipes 16, 16 that connect between the intermediate portion of the rear inclined portion 12*c* in the lower pipes 12, 12 and the rear end of the seat rails 9, 9, and the rear half portion of the rear inclined portion 12*c* in the lower pipes 12, 12. Here, the rear end of the rear inclined portion 12*c* is joined to the intermediate portion of the seat rails 9. Also, the left and right seat rails 9, 9 have an unillustrated cross member disposed therebetween at a suitable location, and are bound to each other and integrated.

The engine unit 5 is mounted on the center frame portion 6 of the body frame 2. The engine in the engine unit 5 is formed by, for example, a water-cooled single cylinder, and is in a so-called upright layout with the axis of an unillustrated crankshaft aligned with the front-rear direction of the vehicle. A fuel tank 17 is mounted on the center frame portion 6 of the body frame 2 above the engine unit 5. A fuel pump 18 is placed below the fuel tank 17.

Various components mounted on the body frame 2 will now be described. In the center frame portion 6, a steering column 19 located at the center portion in the width direction of the vehicle is supported between the front end portions of the upper inclined portions 11*a* in the upper pipes 11, 11, and a steering shaft 20 that is steerably journalled is passed through the steering column 19. A steering handlebar 21 is coupled to the upper end portion of the steering shaft 20, and a front wheel operating mechanism 22 is coupled to the lower end portion of the steering shaft 20.

On the front frame portion 7, the front wheels 3 are mounted in a suspended manner, and a front cushion unit 23 for mitigating the force input from the front wheels 3 during running is mounted. The rear wheels 4 are suspended onto the body frame 2 via a swing arm 24 and a rear cushion unit 25. More specifically, the front end portion of the swing arm 24 is swingably journalled to a pair of left and right lower brackets 26 provided to the center frame portion 6 of the body frame 2, and the rear wheels 4 are supported on the rear end portion of the swing arm 24.

Incidentally, the engine unit 5 is configured such that a front drive shaft 28 and a rear drive shaft 29 are projected from the front and rear sidewalls of a crankcase 27, respectively, and torque is transmitted to the front wheels 3 and the rear wheels 4 via these drive shafts. Now, such a transmission mechanism is described in detail. The front drive shaft 28 is coupled to a front final reduction gear unit 30 supported on the front frame portion 7 near the front wheels 3, and the rear drive shaft 29 is coupled to a rear final reduction gear unit 31 supported on the rear end portion of the swing arm 24. Torque from the engine unit 5 is transmitted to the front wheels 3 via the front drive shaft 28 and the front final reduction gear unit 30, and is transmitted to the rear wheels 4 via the rear drive shaft 29 and the rear final reduction gear unit 31.

While the engine unit 5 has the front drive shaft 28 and the rear drive shaft 29 projected from the front and rear sidewalls of the crankcase 27 as described above, the engine unit 5 has a cylinder portion 32 which is disposed upright on the crankcase 27 and in which a piston is inserted. A throttle body 33 is connected to the rear portion of the cylinder portion 32, and an air cleaner apparatus 40 is connected to the upstream end of the throttle body 33.

The air cleaner apparatus 40 is placed at substantially the center in the vehicle width direction while being supported at a suitable location on the seat rails 9 below the seat 8, and is connected to the throttle body 33 on its front surface side. It should be noted that in FIG. 1, reference sign 34 denotes an exhaust pipe whose upstream end portion is connected to the front portion of the cylinder portion 32, and reference sign 35 denotes a muffler connected to the exhaust pipe 34. Hereinbelow, the air cleaner apparatus 40 will be described in detail.

Figure 2:
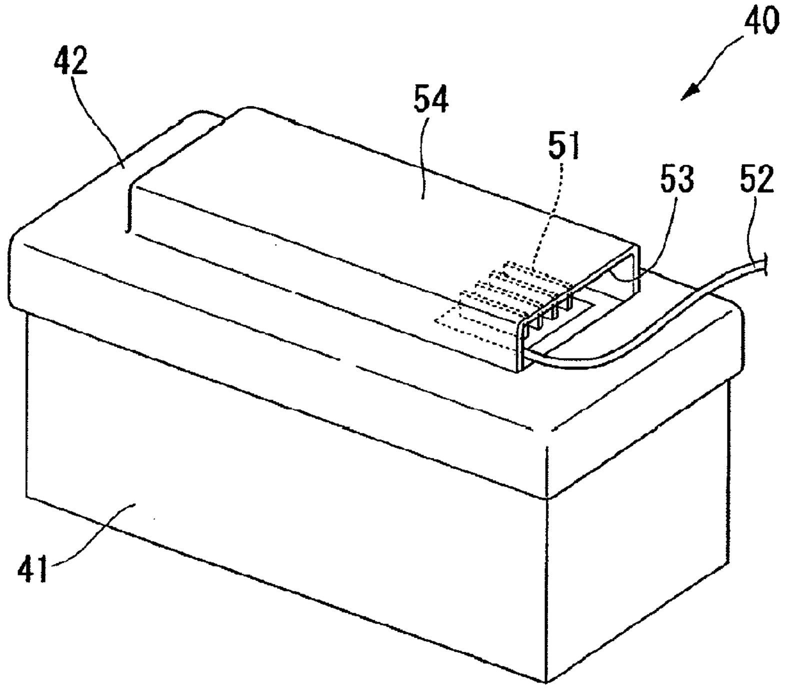
FIG. 2 is a perspective view of an air cleaner apparatus according to a first embodiment.

FIG. 2 shows the exterior configuration of the air cleaner apparatus 40. As shown in this drawing, the air cleaner apparatus 40 includes an air cleaner box 41, and a lid 42 that is removably attached atop the air cleaner box 41.

Figure 3:
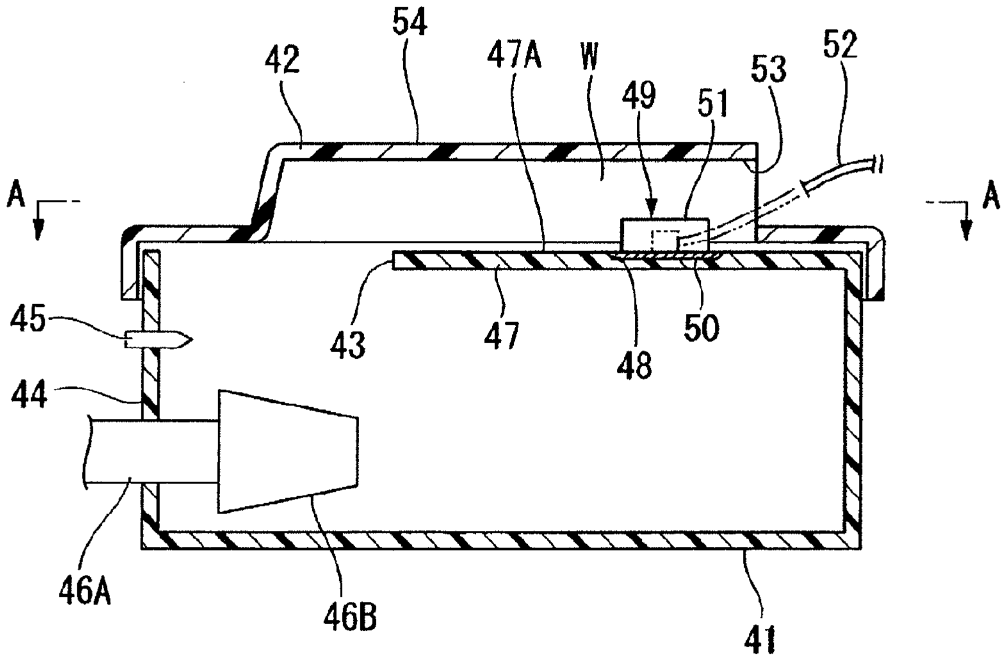
FIG. 3 is a longitudinal sectional view of the air cleaner apparatus according to the first embodiment.

The air cleaner box 41 is formed from a resin material, and assumes a horizontally elongated, substantially rectangular parallelepiped shape whose longitudinal direction is aligned with the front-rear direction of the vehicle (see also FIG. 1). As shown in FIG. 3, an opening 43 that opens upwards is formed on one side in the longitudinal direction of an upper wall portion 47 of the air cleaner box 41. It should be noted that the opening 43 is formed closer to the side that is placed toward the front when mounting the air cleaner apparatus 40 onto the saddle-ride type four-wheeled vehicle 1.

In one vertical wall portion 44 which forms the vertical wall of the air cleaner box 41 on the side where the opening 43 is formed, an intake temperature sensor 45 and a connecting tube 46A are disposed in that order in the direction from top to bottom. An element 46B is connected to the connecting tube 46A. The intake temperature sensor 45 and the connecting tube 46A are both removably supported in place while penetrating the one vertical wall portion 44. The intake temperature sensor 45 has its sensing portion placed inside the air cleaner box 41, and the connecting tube 46A has the element 46B removably attached to its end portion located inside the air cleaner box 41. The intake temperature sensor 45 senses the temperature of the outside air admitted into the air cleaner box 41. The element 46B removes dust or the like from the outside air admitted into the air cleaner box 41 by means of a filter. The connecting tube 46A sends the outside air that has been cleaned by the element 46B to the throttle body 33 described above.

Figure 4:
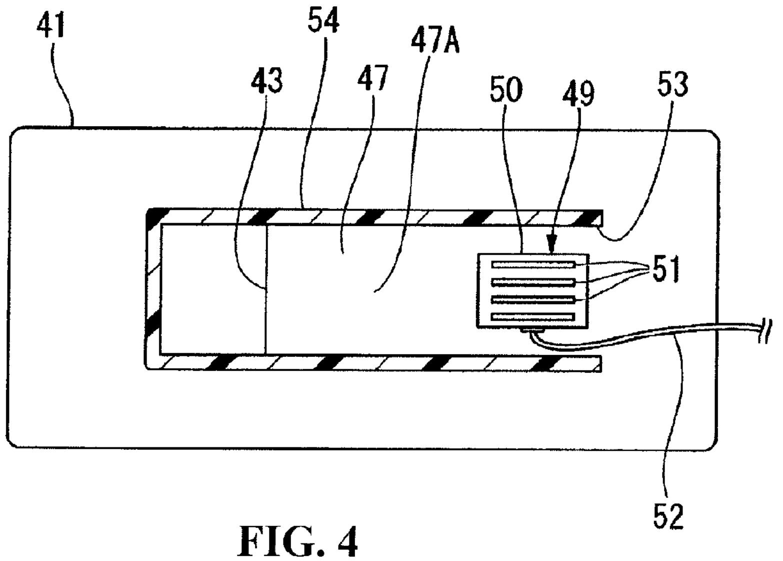
FIG. 4 is a sectional view taken along the line A-A of FIG. 3.

Also, a recess 48 recessed in a rectangular shape is formed in the upper wall portion 47 of the air cleaner box 41 in which the opening 43 is formed. A regulator 49 as electrical equipment is removably attached to the recess 48. The regulator 49 includes a substrate portion 50 accommodating a substrate and a radiator fin 51 disposed upright on its upper surface, and is attached in a state in which the substrate portion 50 is embedded in the recess 48 and the radiator fin 51 is exposed from the recess 48. Also, as shown in FIG. 4, the radiator fin 51 is a plate-like member, and the regulator 49 is attached to the recess 48 in a state with the extending direction of the radiator fin 51 aligned parallel to the longitudinal direction of the air cleaner box 41. It should be noted that a regulator harness 52 is connected to the substrate portion 50. The harness 52 is connected to an unillustrated ECU (Engine Control Unit) that is mounted on the saddle-ride type four-wheeled vehicle 1.

On the other hand, referring to FIGS. 2 and 3, the lid 42 is a member that covers the opening 43 and the upper wall portion 47 of the air cleaner box 41, and is attached from above the air cleaner box 41 to cover the entire top portion of the air cleaner box 41. Further, in the lid 42, there is formed an intake port 53 that communicates with the opening 43 of the air cleaner box 41 to send the outside air into the air cleaner box 41.

As shown in FIG. 3, in the lid 42, there is formed a bulging portion 54 as a duct portion with a square sectional shape which extends along the longitudinal direction of the lid 42 from the opening 43 of the air cleaner box 41 which is located at a lower portion of the lid 42. The intake port 53 is formed by opening an end portion of the bulging portion 54. More specifically, the bulging portion 54 is formed so as to extend above an outer wall surface 47A, which is an upper surface of the upper wall portion 47, in such a way as to cover the regulator 49 attached to the upper wall portion 47 of the air cleaner box 41. After covering the regulator 49, the bulging portion 54 is opened at its end portion, thereby forming the intake port 53. That is, in the air cleaner apparatus 40 according to this embodiment, the intake port 53 is formed by extending an opening formed in the wall surface of the lid 42 so as to cover the regulator 49 by the bulging portion 54 serving as a duct portion.

Then, by forming the intake port 53 as described above, in the air cleaner apparatus 40, an intake passage W for sucking in the outside air is formed by the bulging portion 54 and the upper wall portion 47 (outer wall surface 47A) as shown in FIG. 3. The outside air can be sucked in from this intake passage W, and the admitted outside air is cleaned by the element 46B and then sent to the throttle body 33. Further, the regulator 49 is placed facing inside this intake passage W. Also, the regulator harness 52 for the regulator 49 covered by the intake port 53 is led out to the outside from the opening of the intake port 53.

Therefore, in the first embodiment described above, since the regulator 49 as electrical equipment is placed inside the intake port 53, active forced-air cooling is provided to enable an improvement in the efficiency of cooling of the electrical equipment. In addition, since an intake air flow (cooling air flow) can be supplied to the regulator 49 in a stable manner both when the vehicle is running and when it is at a stop, a rise in the temperature of the regulator 49 can be effectively suppressed. Furthermore, when performing maintenance such as replacing or the like of the element 46B of the air cleaner apparatus 40, the lid 42 is removed to make access to the interior of the air cleaner box 41. At this time, since the regulator 49 is attached not to the lid 42 but to the air cleaner box 41 side, the regulator 49 does not become obtrusive when performing maintenance, in particular, when removing the lid 42 to replace the element 46B. Therefore, the ease of maintenance of the air cleaner apparatus 40 can be improved while enabling active cooling of the regulator 49.

Also, in the regulator 49, the substrate portion 50 is placed in the recess 48 of the air cleaner box 41, and only the radiator fin 51 is exposed onto the intake passage W as shown in FIG.

3. Thus, the intake resistance against the outside air (intake air flow) admitted into the air cleaner box 41 can be reduced. Therefore, intake resistance can be reduced while enhancing cooling efficiency by providing a stable supply of an intake air flow to the radiator fin 51.

Further, since the radiator fin 51 is placed parallel to the direction of flow velocity of the intake air flow, the intake resistance can be reduced while enhancing the efficiency of cooling of the regulator 49.

Also, since the regulator 49 as heat-generating electrical equipment is placed inside the intake port 53 of the air cleaner box 41, and the intake temperature sensor 45 is provided on the downstream side of the regulator 49, even when the intake temperature rises due to the regulator 49, temperature sensing that takes such a temperature rise into consideration can be performed on the downstream side. Therefore, it is possible to perform optimum fuel injection, and efficiently bring out an engine output.

Figure 5:
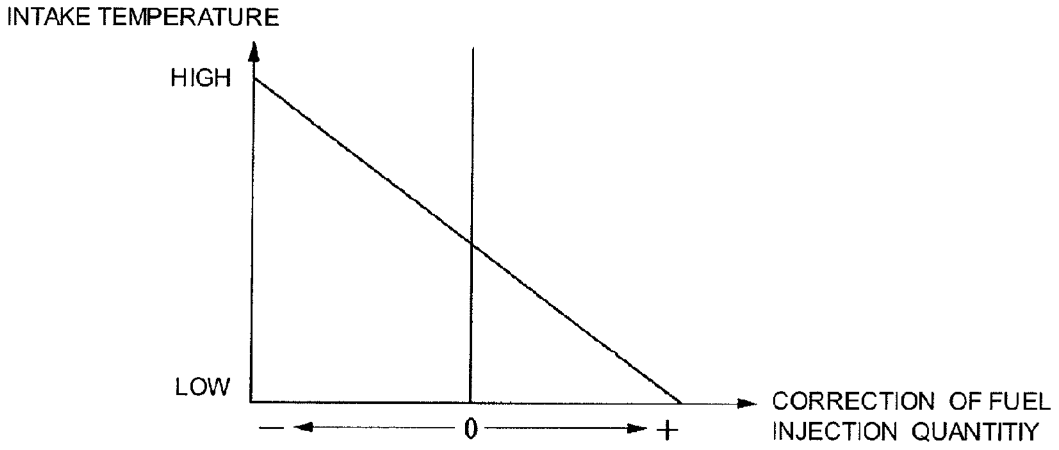
FIG. 5 is a diagram showing the relationship between the intake temperature of an intake air flow admitted into an air cleaner apparatus and correction of the injection quantity of a fuel injector.

Here, FIG. 5 shows an example of the relationship between the intake temperature of an intake air flow and correction of the injection quantity of a fuel injector in order to perform optimum fuel injection. In FIG. 5, the horizontal axis represents the correction value of the fuel injection quantity of the fuel injector, and the vertical axis represents the intake temperature of the intake air flow. This example shows a parameter for fuel injection control in which as the intake temperature becomes lower, the fuel injection quantity is increased (the correction value is shifted in the positive direction) because the quantity of oxygen increases, and as the intake temperature becomes higher, the fuel injection quantity is decreased (the correction value is shifted in the negative direction) because the quantity of oxygen decreases. That is, an increase/decrease in oxygen due to variation in the intake temperature of the intake air flow affects the optimum quantity of fuel to be mixed into the intake air flow, and hence accurate sensing of the intake temperature is extremely important for optimum fuel injection control. Therefore, if the regulator 49 is placed inside the intake port 53 of the air cleaner box 41, accurate temperature sensing that takes a rise in the temperature of the regulator 49 into consideration can be performed on the downstream of the intake air flow. Thus, it is possible to perform optimum fuel injection, and efficiently bring out an engine output.

Also, as shown in FIG. 3, the intake temperature sensor 45 is placed on the upstream side of the element 46B along the flow of the intake air flow, and in the one vertical wall portion 44 that is the inner wall surface of the air cleaner box 41. Therefore, when removing the lid 42 to perform maintenance such as replacing or the like of the element 46B of the air cleaner apparatus 40, since the regulator 49 is attached not to the lid 42 but to the air cleaner box 41 side, the intake temperature sensor 45 does not become obtrusive when performing maintenance, in particular, when removing the lid member for replacing the element. Also, since the intake temperature sensor 45 is supported on the air cleaner box 41, attachment of the intake temperature sensor 45 can be facilitated. Therefore, the ease of assembly and the ease of maintenance can be improved.

Figure 6:
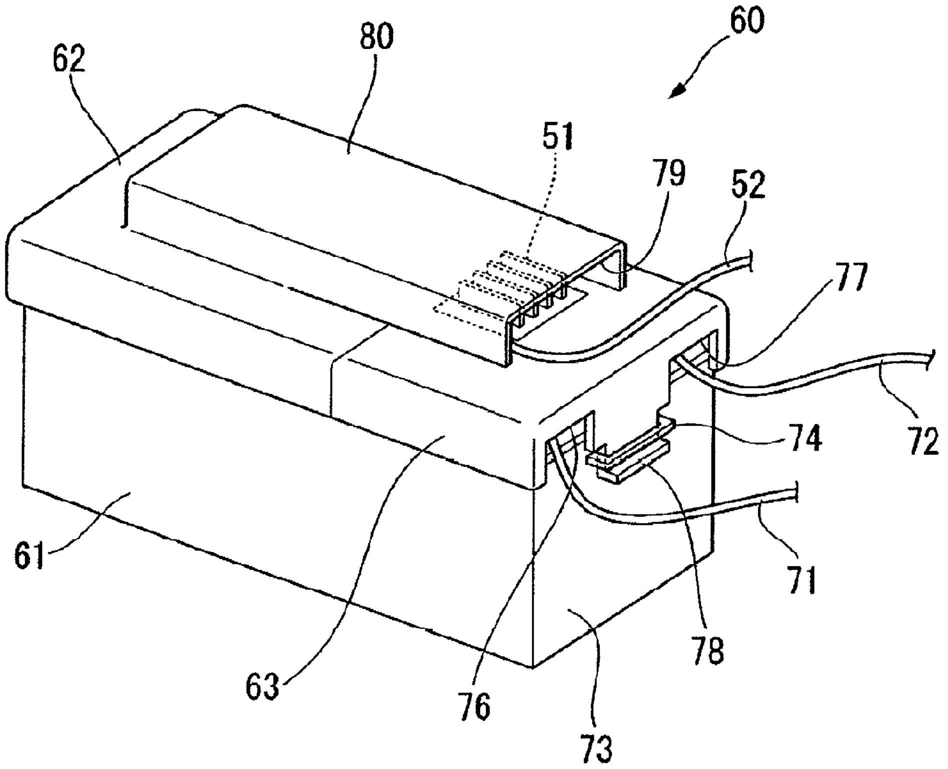
FIG. 6 is a perspective view of an air cleaner apparatus according to a second embodiment.

Next, a second embodiment of the present invention will be described. FIG. 6 shows the exterior configuration of an air cleaner apparatus 60 according to this embodiment. It should be noted that as in the first embodiment, the air cleaner apparatus 60 is mounted on the saddle-ride type four-wheeled vehicle 1, and its placement position or the like in the saddle-ride type four-wheeled vehicle 1 is assumed to be the same as that in the first embodiment and description thereof is omitted. Also, components that are the same as those in the first embodiment are denoted by the same reference signs, and description thereof is partially omitted.

As shown in FIG. 6, in this embodiment, the air cleaner apparatus 60 includes an air cleaner box 61, and a first lid 62 and a second lid 63 that are removably attached atop the air cleaner box 61.

Figure 7:
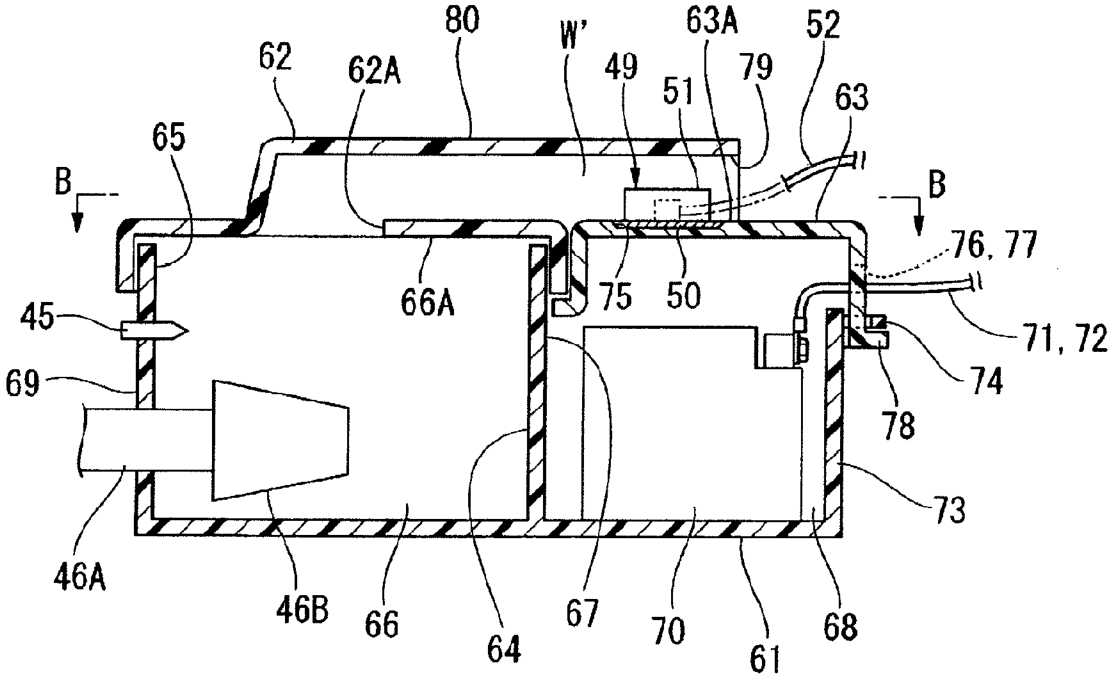
FIG. 7 is a longitudinal sectional view of the air cleaner apparatus according to the second embodiment.

The air cleaner box 61 is formed from a resin material, and assumes a horizontally elongated, substantially rectangular parallelepiped shape whose longitudinal direction is aligned with the front-rear direction of the vehicle (see also FIG. 1). As shown in FIG. 7, by disposing a partition wall 64 upright in the interior of the air cleaner box 61 near the center in the longitudinal direction, the interior space of the air cleaner box 61 is divided into a first accommodating portion 66 having an opening 65 that opens upwards, and a second accommodating portion 68 having an opening 67 that opens upwards. It should be noted that the side where the first accommodating portion 66 is formed in the air cleaner box 61 is the side that is placed toward the front upon mounting on the saddle-ride type four-wheeled vehicle 1.

In a first vertical wall portion 69 on the vehicle's front side which is opposed to the partition wall 64 in the first accommodating portion 66, the intake temperature sensor 45 and the connecting tube 46A are disposed in that order in the direction from top to bottom. The element 46B is connected to the connecting tube 46A. The intake temperature sensor 45 and the connecting tube 46A are both removably supported in place while penetrating the first vertical wall portion 69. The connecting tube 46A has the element 46B removably attached to its end portion located inside the air cleaner box 61.

A battery 70 is accommodated in the second accommodating portion 68, and battery harnesses 71, 72 are respectively connected to the positive and negative electrode terminals of the battery 70 (see also FIG. 6). Also, a second vertical wall portion 73 on the vehicle's rear side which is opposed to the partition wall 64 in the second accommodating portion 68 is formed lower than the partition wall 64, and in its outer wall surface, there is formed an engaging portion 74 for locking engagement with the second lid 63 which will be described later in detail.

Next, the first lid 62 is a member covering the opening 65 of the first accommodating portion 66, and is attached from above the air cleaner box 61, and its length and width dimensions are so set as to cover the entire top portion of the first accommodating portion 66. Also, the second lid 63 is a member covering the opening 67 of the second accommodating portion 68, and is attached from above the air cleaner box 61, and its length and width dimensions are so set as to cover the entire top portion of the second accommodating portion 68.

Figure 8:
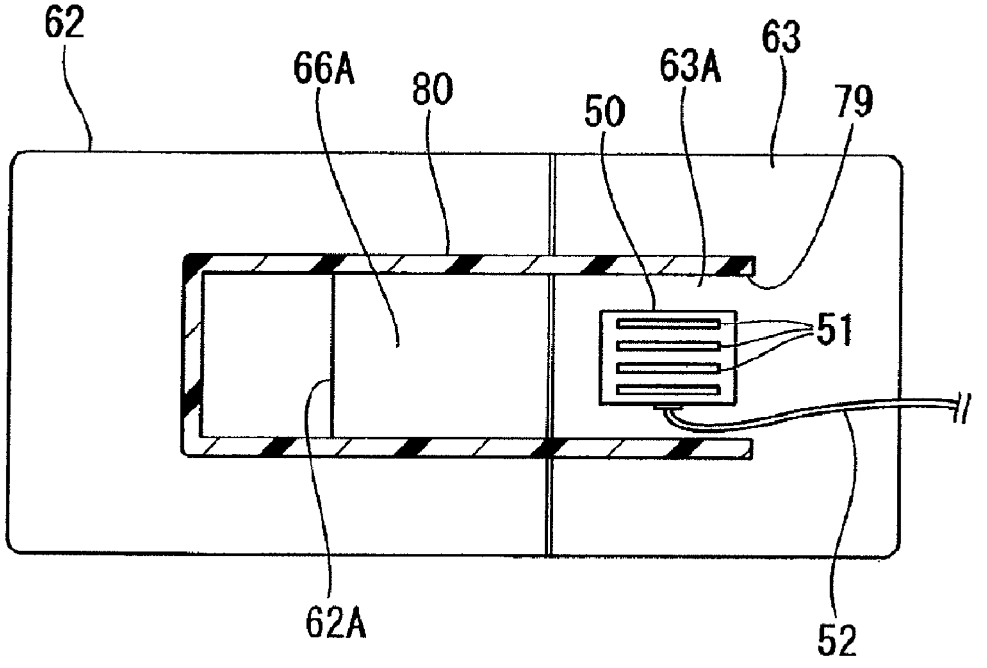
FIG. 8 is a sectional view taken along the line B-B of FIG. 6.

Here, first, in the second lid 63, a recess 75 recessed in a rectangular shape is formed in its upper surface, and the regulator 49 as electrical equipment is removably attached to the recess 75. The regulator 49 is the same as that described with reference to the first embodiment, includes the substrate portion 50 accommodating a substrate and the radiator fin 51 disposed upright on its upper surface, and is in a state in which the substrate portion 50 is embedded in the recess 75 and the radiator fin 51 is exposed from the recess 75. Also, as in the first embodiment, as shown in FIG. 8, the regulator 49 is accommodated in the recess 75 in a state with the extending direction of the radiator fin 51 aligned parallel to the longitudinal direction of the air cleaner box 61.

Also, harness openings 76, 77 are formed side by side (see also FIG. 6) at an edge of the second lid 63 which is located on the side opposite to the first lid 62. An engaging claw 78 that projects downwards is formed between the harness openings 76, 77. Battery harnesses 71, 72 for the battery 70 are led out to the outside from the harness openings 76, 77, and the engaging claw 78 is engaged with the engaging portion 74 formed in the second vertical wall portion 73 of the second accommodating portion 68.

Further, in the first lid 62, there is formed an intake port 79 that communicates with the opening 65 of the air cleaner box 61 to send the outside air into the air cleaner box 61.

As shown in FIG. 7, in the first lid 62, an inlet port 62A communicating with the opening 65 is formed in its substantially central region while partially overlapping the opening 65 of the air cleaner box 61, and further, a bulging portion 80 is formed as a duct portion with a rectangular sectional shape which extends along the longitudinal direction of the first lid 62 from the inlet port 62A. The inlet port 79 is formed by opening an end portion of the bulging portion 80. More specifically, the bulging portion 60 is formed so as to extend above an upper wall portion 66A of the first lid 62 and an outer wall surface 63A that is an upper surface of the second lid 63, in such a way as to cover the regulator 49 attached to the second lid 63 on top of the second accommodating portion 68 adjacent to the first accommodating portion 66. After covering the regulator 49, the bulging portion 80 is opened at its end portion, thereby forming the intake port 79. That is, in the air cleaner apparatus 60 according to this embodiment, the intake port 79 is formed by extending an opening formed in the wall surface of the first lid 62 so as to cover the regulator 49 by the bulging portion 80 serving as a duct portion.

Then, by forming the intake port 79 as described above, in the air cleaner apparatus 60, an intake passage W' for sucking in the outside air is formed by the bulging portion 80, the outer wall surface 63A of the second lid 63, and the upper wall portion 66A of the first lid as shown in FIG. 7. The outside air can be sucked in from this intake passage W', and the admitted outside air is cleaned by the element 46B and then sent to the throttle body 33. Further, the regulator 49 is placed facing inside this intake passage W'. Also, the regulator harness 52 for the regulator 49 covered by the intake port 79 is led out to the outside from the opening of the intake port 79.

Therefore, in the second embodiment described above, since the regulator 49 as electrical equipment is placed inside the intake port 79, active forced-air cooling is provided to enable an improvement in the efficiency of cooling of the electrical equipment. In addition, since an intake air flow (cooling air flow) can be supplied to the regulator 49 in a stable manner both when the vehicle is running and when it is at a stop, a rise in the temperature of the regulator 49 can be effectively suppressed. Furthermore, when performing maintenance such as replacing or the like of the element 46B of the air cleaner apparatus 60, the first lid 62 is removed to make access to the interior of the air cleaner box 61. At this time, since the regulator 49 is attached not to the first lid 62 but to the air cleaner box 61 side, the regulator 49 does not become obtrusive when performing maintenance, in particular, when removing the first lid 62 to replace the element 46B. Therefore, the ease of maintenance of the air cleaner apparatus 60 can be improved while enabling active cooling of the regulator 49.

Also, in the regulator 49, the substrate portion 50 is placed in the recess 75 of the air cleaner box 61, and only the radiator fin 51 is exposed onto the intake passage W' as shown in FIG. 7. Thus, the intake resistance against the outside air (intake air flow) admitted into the air cleaner box 61 can be reduced. Therefore, intake resistance can be reduced while enhancing cooling efficiency by providing a stable supply of an intake air flow to the radiator fin 51. Furthermore, since the radiator fin 51 is placed parallel to the direction of flow velocity of the intake air flow, the intake resistance can be reduced while enhancing the efficiency of cooling of the regulator 49.

Also, the regulator 49 as heat-generating electrical equipment is placed inside the intake port 79 of the air cleaner box 61, and the intake temperature sensor 45 is provided on the downstream side of the regulator 49. Thus, even when the intake temperature rises due to the regulator 49, temperature sensing that takes such a temperature rise into consideration can be performed on the downstream side. Therefore, it is possible to perform optimum fuel injection, and efficiently bring out an engine output. Further, as shown in FIG. 7, the intake temperature sensor 45 is placed on the upstream side of the element 46B along the flow of the intake air flow, and in the first vertical wall portion 69 that is the inner wall surface of the first accommodating portion 66 in the air cleaner box 61. Therefore, when removing the first lid 62 to perform maintenance such as replacing or the like of the element 46B of the air cleaner apparatus 60, since the intake temperature sensor 45 is attached not to the first lid 62 but to the air cleaner box 61 side, the intake temperature sensor 45 does not become obtrusive when performing maintenance, in particular, when removing the lid member for replacing the element. Also, since the intake temperature sensor 45 is supported on the air cleaner box 61, attachment of the intake temperature sensor 45 can be facilitated. Therefore, the ease of assembly and the ease of maintenance can be improved.

Also, the air cleaner box 61 is integrally provided with the second accommodating portion 68 having the battery opening 67 and accommodating the battery 70, the battery opening 67 of the second accommodating portion 68 is covered by the second lid 63, and the regulator 49 is placed on the second lid 63. Thus, the regulator 49 and the battery 70 can be placed in close proximity to each other, thereby minimizing the harness length.

Figure 9:
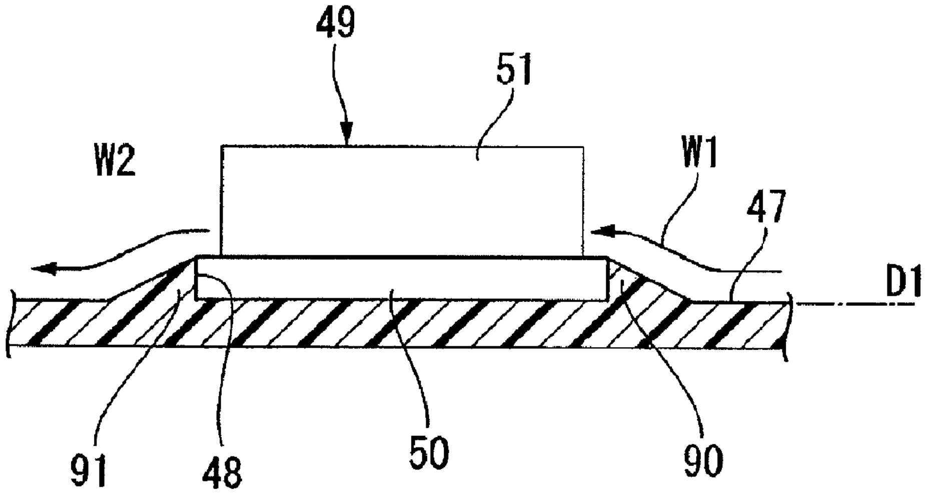
FIG. 9 is a partial enlarged view of an air cleaner apparatus according to a third embodiment.

Next, a third embodiment of the present invention will be described. In this embodiment, the structure of the recess 48 for accommodating the regulator 49 according to the first embodiment is modified to achieve an improvement in cooling efficiency. FIG. 9 shows an enlarged view of the accommodating portion for the regulator 49 according to this embodiment. It should be noted that components that are the same as those in the first embodiment are denoted by the same reference signs.

That is, in this embodiment, as shown in FIG. 9, the recess 48 for accommodating the regulator 49 is formed at a position elevated by a height equal to the height of the substrate portion 50 from a reference plane D1 of the upper wall portion 47 of the air cleaner box 41. In the upper wall portion 47, there are formed a guide portion 90 located on the entrance side of the intake port 53, and a guide portion 91 located on the air cleaner box 41 side, which gradually rise up from the upper wall portion 47 toward the edge of the recess 48 along the flow directions (both directions) of an intake air flow.

Therefore, in the third embodiment as described above, an intake air flow W1 admitted from the intake port 53 is smoothly guided to the radiator fin 51 along the inclined surface of the guide portion 90, and an intake air flow W2 having passed through the radiator fin 51 is smoothly sent to the air cleaner box 41 side along the inclined surface of the guide portion 91. Thus, an intake air flow can be gathered to the radiator fin 51 to enable a further improvement in cooling efficiency. In addition, since the intake air flow is guided not to the substrate portion 50 but to the radiator fin 51 by the guide portions 90, 91, intake resistance can be reduced.

While a modification of the first embodiment is illustrated in the third embodiment, the guide portions 90, 91 mentioned above may be applied to the second embodiment and formed on the upper surface of the second lid 63. The same effect as that described above can be obtained in this case as well.

Figure 10:
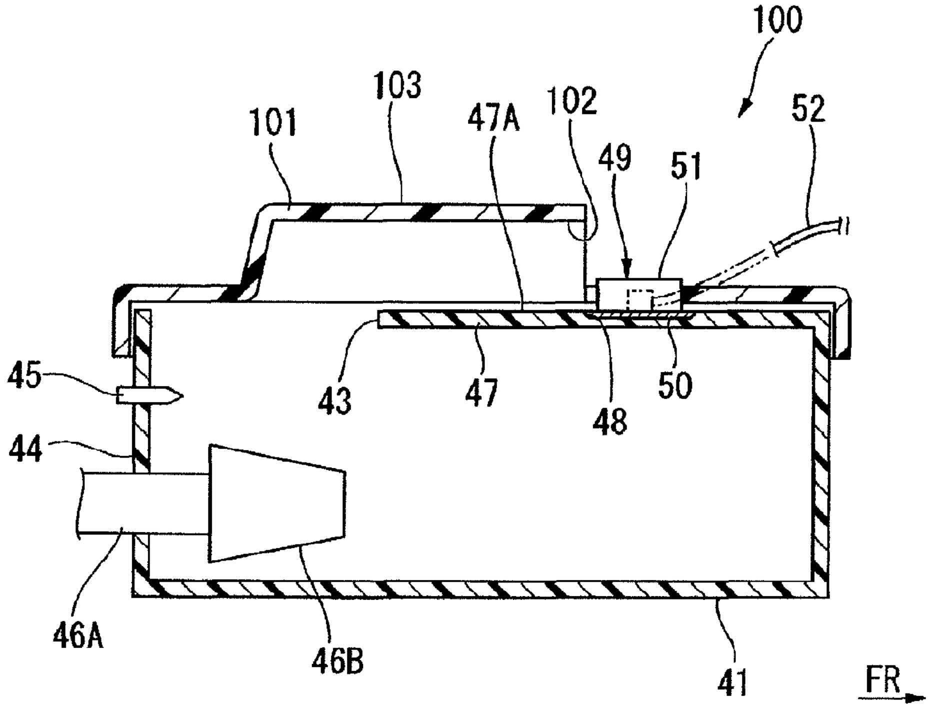
FIG. 10 is a longitudinal sectional view of an air cleaner apparatus according to a fourth embodiment.

Next, a fourth embodiment of the present invention will be described. FIG. 10 shows a longitudinal section of an air cleaner apparatus 100 according to this embodiment.

The air cleaner apparatus 100 according to this embodiment includes the air cleaner box 41, and a lid 101 that is removably attached atop the air cleaner box 41. In the following, portions that are the same as those in the first embodiment are denoted by the same reference signs and description thereof is omitted, and this embodiment is described while mainly focusing on differences.

In the lid 101, there is formed an intake port 102 that communicates with the opening 43 of the air cleaner box 41 to send the outside air into the air cleaner box 41. The intake port 102 is formed by opening an end portion of a bulging portion 103, which is formed in the lid 101 and serves as a duct portion with a square sectional shape extending along the longitudinal direction of the lid 101 from the opening 43 of the air cleaner box 41 located at a lower portion of the lid 101.

The bulging portion 103 is formed so as to extend from the opening 43 to a position immediately in front of (near) the regulator 49 attached to the upper wall portion 47 of the air cleaner box 41, and is opened at its end portion to form the above-mentioned intake port 102. That is, in the air cleaner apparatus 100 according to this embodiment, the intake port 102 is formed near the regulator 49 and so as to be directed toward the regulator 49.

Also, in this embodiment, the air cleaner apparatus 100 is placed so that the intake port 102 is directed toward the front of the vehicle as referred to by the arrow FR in the drawing. In this case, in the vehicle mounted with the air cleaner apparatus 100 according to this embodiment, the throttle body is placed in rear of the air cleaner apparatus 100.

In the air cleaner apparatus 100 according to the fourth embodiment described above, the regulator 49 is placed on the upper wall portion 47 as the outer wall surface of the air cleaner box 41 near the intake port 102, and the intake port 102 is directed toward the regulator 49. Thus, in addition to cooling provided by making the running air flow directly impinge on the regulator 49, active forced-air cooling is provided by the intake air flow entering the intake port 102, thereby making it possible to improve the efficiency of cooling of the regulator 49. Furthermore, when performing maintenance such as replacing or the like of the element 46B of the air cleaner apparatus 100, the lid 101 is removed to make access to the interior of the air cleaner. At this time, since the regulator 49 is attached not to the lid 101 but to the air cleaner box 41 side, the regulator 49 does not become obtrusive when performing maintenance. Therefore, the ease of maintenance of the air cleaner can be improved while enabling active cooling of the electrical equipment. While in this embodiment the air cleaner apparatus 100 is placed so that the intake port 102 is directed toward the front of the vehicle, the intake port 102 may be directed toward the rear of the vehicle.

Figure 11:
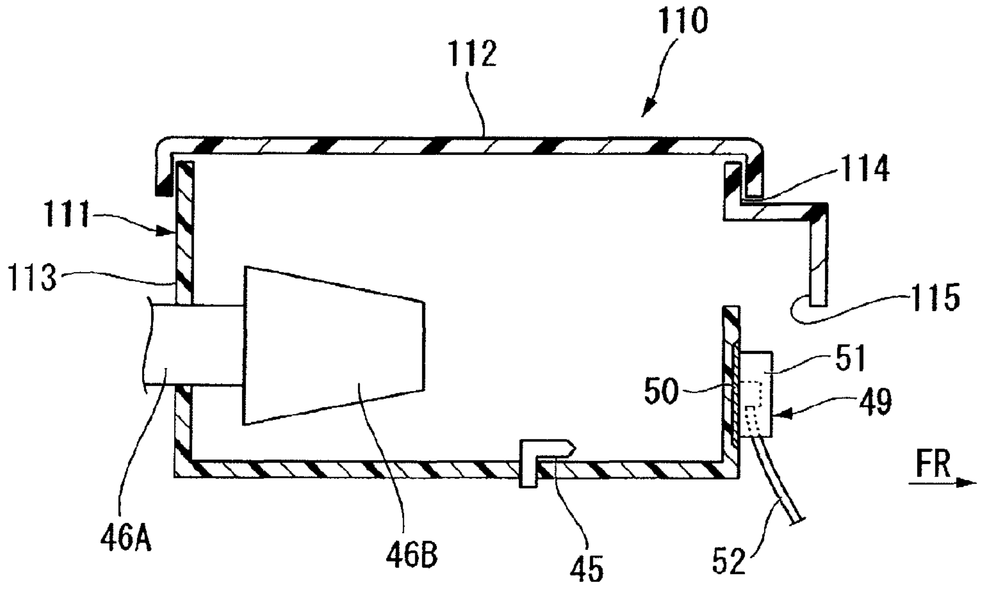
FIG. 11 is a longitudinal sectional view of an air cleaner apparatus according to a fifth embodiment.

Next, a fifth embodiment of the present invention will be described. FIG. 11 shows a longitudinal section of an air cleaner apparatus 110 according to this embodiment. In the following, portions that are the same as those in the first embodiment are denoted by the same reference signs and description thereof is omitted.

The air cleaner apparatus 110 according to this embodiment includes an air cleaner box 111 having an opening at the top, and a lid 112 that is removably attached atop the air cleaner box 111.

The air cleaner box 111 assumes a horizontally elongated, substantially rectangular parallelepiped shape whose longitudinal direction is aligned with the front-rear direction of the vehicle. The connecting tube 46A is provided in one vertical wall portion 113 forming a vertical wall on one side in the longitudinal direction of the air cleaner box 111. The element 46B is connected to the connecting tube 46A. Also, the intake temperature sensor 45 whose sensing portion is placed inside the air cleaner box 111 is provided to the bottom wall of the air cleaner box 111.

Referring to the arrow FR in the drawing, when mounting the air cleaner apparatus 110 onto the vehicle, the connecting tube 46A is led out to the rear of the vehicle. In the vehicle on which the air cleaner apparatus 110 according to this embodiment is mounted, the throttle body is placed in rear of the air cleaner apparatus 110. That is, in the air cleaner apparatus 110, the one vertical wall portion 113 is a portion that is placed in the vehicle while being directed toward the rear of the vehicle.

The other vertical wall portion 114 opposed to the one vertical wall portion 113 in the air cleaner box 111 is a portion that is directed toward the front side of the vehicle upon mounting on the vehicle. The regulator 49 is removably attached to the outer wall surface of the other vertical wall portion 114. The attaching of the regulator 49 is performed in the same manner as in the first embodiment. The regulator 49 is attached in such a way that the substrate portion 50 is embedded in the outer wall surface of the other vertical wall portion 114, and its radiator fin 51 is exposed to the outside. Also, the regulator harness 52 is led out downwards.

Further, an intake port 115 that communicates with the interior of the air cleaner box 111 to send the outside air into the air cleaner box 111 is formed above the regulator 49 and in the other vertical wall portion 114. The intake port 115 is formed at a position near the regulator 49 in the other vertical wall portion 114, and is formed so as to be directed toward the regulator 49, that is, directed downwards.

In the air cleaner apparatus 110 according to the fifth embodiment described above, in addition to the effect described with reference to the above-mentioned fourth embodiment, since the regulator 49 is placed on the other vertical wall portion 114 located on the front side of the vehicle, which is a portion on which the running air flow readily impinges on, thereby enabling an improvement in cooling efficiency.

While embodiments of the present invention have been described in the foregoing, it is needless to mention that the present invention is not limited to the above-mentioned embodiments, and various changes are possible without departing from the scope of the present invention, including the configuration, structure, shapes, sizes, numbers, placement, and the like of components. For example, while these embodiments are directed to the case in which the air cleaner box 41 and the air cleaner box 61 have a horizontally elongated rectangular parallelepiped shape extending in the front-rear direction of the vehicle, the air cleaner box 41 and the air cleaner box 61 may have a substantially cubic shape, or may have a vertically elongated rectangular parallelepiped shape or the like extending in the up-down direction of the vehicle.

What is claimed is:

1. An air cleaner apparatus comprising:

an air cleaner box including an opening;

an element on which maintenance can be performed through the opening and which is placed in the air cleaner box; and a lid member that covers the opening, wherein the lid member is provided with an intake port communicating with the opening, electrical equipment is attached to an outer surface of an outer wall of the air cleaner box, the intake port is extended to the outer wall surface of the air cleaner box so as to cover the electrical equipment, and the electrical equipment is placed facing inside an intake passage connecting between the intake port and the opening, wherein the electrical equipment includes a substrate portion accommodating a substrate, and a radiator fin disposed upright on an upper surface of the electrical equipment; and a recess is provided in the outer surface of the outer wall of the air cleaner box, the substrate portion of the electrical equipment is placed into the recess, and the radiator fin is exposed from the recess.

2. The air cleaner apparatus according to claim 1, wherein a guide portion for guiding an intake air flow admitted from the intake port to the radiator fin is formed in the outer surface of the outer wall of the air cleaner box.

3. The air cleaner apparatus according to claim 1, further comprising:

a guide portion for guiding an intake air flow admitted from the intake port to the radiator fin is formed in the outer surface of the outer wall of the air cleaner box, the guide portion having an outer surface which slopes relative to the outer surface of the outer wall of air cleaner box.

4. The air cleaner apparatus according to claim 2, wherein the electrical equipment is so placed as to make the radiator fin parallel to a direction of flow velocity of the intake air flow admitted from the intake port.

5. The air cleaner apparatus according to claim 1, wherein an intake temperature sensor is attached on a downstream side of the electrical equipment, and an injection quantity of a fuel injector is correctable in accordance with an output of the intake temperature sensor.

6. The air cleaner apparatus according to claim 1, wherein an intake temperature sensor is attached on a vertical wall of the air cleaner box on a downstream side of the electrical equipment, and an injection quantity of a fuel injector can be corrected in accordance with an output of the intake temperature sensor.

7. The air cleaner apparatus according to claim 2, wherein an intake temperature sensor is attached on a downstream side of the electrical equipment, and an injection quantity of a fuel injector can be corrected in accordance with an output of the intake temperature sensor.

8. The air cleaner apparatus according to claim 5, wherein the intake temperature sensor is placed on an upstream side of the element and in an inner wall surface of the air cleaner box.

9. The air cleaner apparatus according to claim 6, wherein the intake temperature sensor is placed on an upstream side of the element and on an inner surface of the vertical wall of the air cleaner box on a downstream side of the electrical equipment.

10. An air cleaner apparatus comprising:

an air cleaner box including an opening;

an element on which maintenance can be performed through the opening and which is placed in the air cleaner box; and a lid member that covers the opening, wherein the lid member is divided into at least a first lid portion and a second lid portion, the first lid portion is provided with an intake port communicating with the opening, and electrical equipment is attached to an outer surface of an upper wall of the second lid portion; and the intake port is extended to the second lid portion so as to cover the electrical equipment, and the electrical equipment is placed facing inside an intake passage connecting between the intake port and the opening, wherein the electrical equipment includes a substrate portion accommodating a substrate, and a radiator fin disposed upright on an upper surface of the electrical equipment; and a recess is provided in the outer surface of the upper wall of the second lid portion, the substrate portion of the electrical equipment is placed into the recess, and the radiator fin is exposed from the recess.

11. The air cleaner apparatus according to claim 10, further comprising:

a guide portion for guiding an intake air flow admitted from the intake port to the radiator fin is formed in the outer wall surface of the air cleaner box, the guide portion having an outer surface which slopes relative to outer surface of the upper wall of the second lid portion.

12. The air cleaner apparatus according to claim 10, wherein a guide portion for guiding an intake air flow admitted from the intake port to the radiator fin is formed in the outer surface of the upper wall of the second lid portion.

13. The air cleaner apparatus according to claim 10, wherein the electrical equipment is so placed as to make the radiator fin parallel to a direction of flow velocity of the intake air flow admitted from the intake port.

14. The air cleaner apparatus according to claim 12, wherein the electrical equipment is so placed as to make the radiator fin parallel to a direction of flow velocity of the intake air flow admitted from the intake port.

15. The air cleaner apparatus according to claim 10, wherein an intake temperature sensor is attached on a vertical wall of the air cleaner box on a downstream side of the electrical equipment, and an injection quantity of a fuel injector can be corrected in accordance with an output of the intake temperature sensor.

16. The air cleaner apparatus according to claim 15, wherein an intake temperature sensor is placed on an upstream side of the element and an inner wall an inner surface of the vertical wall of the air cleaner box on a downstream side of the electrical equipment.

17. The air cleaner apparatus according to claim 10, wherein the air cleaner box is integrally provided with a battery-accommodating portion having an opening and accommodating a battery, and the opening of the battery-accommodating portion is covered by the second lid portion.

18. An air cleaner apparatus comprising:

an air cleaner box including an opening;

an element on which maintenance can be performed through the opening and which is placed in the air cleaner box; and a lid member that covers the opening, wherein electrical equipment is attached to an outer surface of an outer wall of the air cleaner box, and an intake port communicating with an interior of the air cleaner box is formed near the electrical equipment and so as to be directed toward the electrical equipment wherein the electrical equipment includes a substrate portion accommodating a substrate, and a radiator fin extending from an outer surface of the electrical equipment; and a recess is provided in the outer surface of the outer wall of the air cleaner box, the substrate portion of the electrical equipment is placed into the recess, and the radiator fin is exposed from the recess.

19. The air cleaner apparatus according to claim 18, wherein the outer surface of the outer wall of the air cleaner box provided with the recess is a vertical wall surface located on a front side of a vehicle body.

20. The air cleaner apparatus according to claim 18, further comprising:

a guide portion for guiding an intake air flow admitted from the intake port to the radiator fin is formed in the outer surface of the outer wall of the air cleaner box, the guide portion having an outer surface which slopes relative to the outer surface of the outer wall of the air cleaner box.

* * * * *